(12) United States Patent
Ishii

(10) Patent No.: US 11,485,227 B2
(45) Date of Patent: Nov. 1, 2022

(54) WORK VEHICLE

(71) Applicant: Kubota Corporation, Osaka (JP)

(72) Inventor: Yuji Ishii, Sakai (JP)

(73) Assignee: Kubota Corporation, Osaka (JP)

( * ) Notice: Subject to any disclaimer, the term of this patent is extended or adjusted under 35 U.S.C. 154(b) by 100 days.

(21) Appl. No.: 17/104,419

(22) Filed: Nov. 25, 2020

(65) Prior Publication Data

US 2021/0284018 A1 Sep. 16, 2021

(30) Foreign Application Priority Data

Mar. 16, 2020 (JP) .............................. JP2020-045273

(51) Int. Cl.
| | | |
|---|---|---|
| *B60K 23/04* | (2006.01) | |
| *B60K 23/08* | (2006.01) | |
| *B60K 31/02* | (2006.01) | |
| *F16H 48/20* | (2012.01) | |
| *F16H 61/16* | (2006.01) | |
| *B60K 17/16* | (2006.01) | |
| *B60K 31/00* | (2006.01) | |

(52) U.S. Cl.
CPC ............. *B60K 23/04* (2013.01); *B60K 17/16* (2013.01); *B60K 23/08* (2013.01); *B60K 31/00* (2013.01); *B60K 31/02* (2013.01); *B60K 2023/0883* (2013.01); *B60K 2023/0891* (2013.01); *F16H 48/20* (2013.01); *F16H 61/16* (2013.01)

(58) Field of Classification Search
CPC ........ B60K 23/04; B60K 23/08; B60K 17/16; B60K 31/02; B60K 2023/0883; F16H 48/20; F16H 61/16; F16H 63/36; F16H 2059/0282
See application file for complete search history.

(56) References Cited

U.S. PATENT DOCUMENTS

| | | | | |
|---|---|---|---|---|
| 5,057,062 | A * | 10/1991 | Yamasaki ......... | B60K 17/3467 475/221 |
| 6,283,887 | B1 * | 9/2001 | Brown ............... | B60K 23/0808 475/204 |
| 7,503,416 | B2 * | 3/2009 | Sharma .................. | F16H 48/11 475/221 |
| 8,181,731 | B2 | 5/2012 | Bessho et al. | |
| 10,144,284 | B2 * | 12/2018 | Christensen ......... | B60K 23/08 |

FOREIGN PATENT DOCUMENTS

JP        200967081 A     4/2009

\* cited by examiner

*Primary Examiner* — Tinh Dang
(74) *Attorney, Agent, or Firm* — The Webb Law Firm

(57) ABSTRACT

A work vehicle includes a first actuator driving a differential lock device, a second actuator driving the drive-wheel switchover device, a first operational tool for operating driving of the first actuator, a second operational tool for operating driving of the second actuator and a control device. The control device includes a first driving section configured to drive the first actuator in response to a manual operation on the first operational tool and a second driving section configured to drive the second actuator in response to a manual operation on the second operational tool.

9 Claims, 2 Drawing Sheets

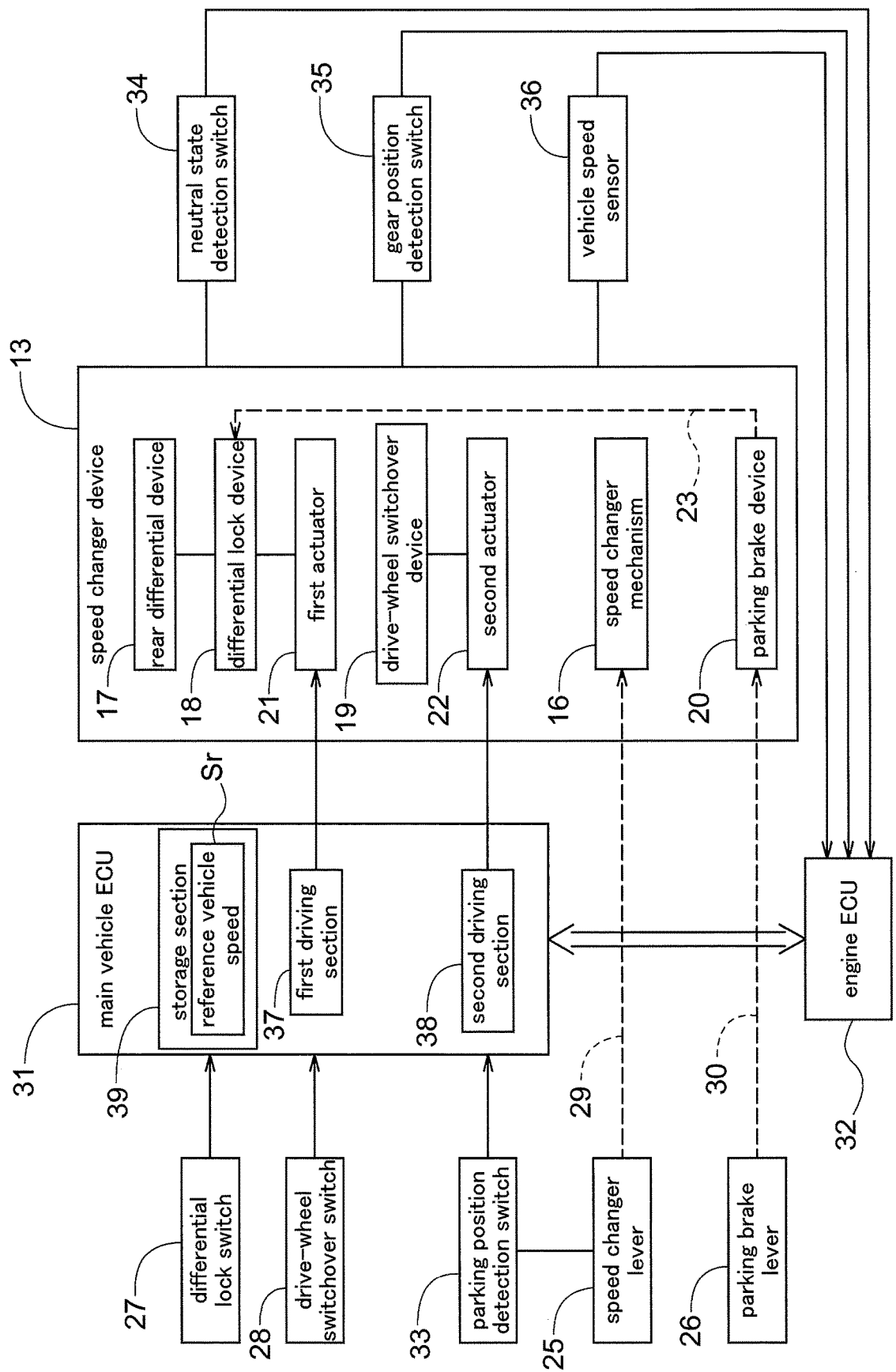

WORK VEHICLE

CROSS-REFERENCE TO RELATED APPLICATION

This application claims priority to Japanese Patent Application No. 2020-045273 filed Mar. 16, 2020, the disclosure of which is hereby incorporated by reference in its entirety.

BACKGROUND OF THE INVENTION

1. Field of the Invention

The present invention relates to a work vehicle.

2. Description of the Related Art

As a work vehicle, there is conventionally known a work vehicle disclosed in JP2009-67081 A for example. The work vehicle disclosed in JP2009-67081 A includes a traveling device having left and right drive wheels (referred to as "rear wheels (12)" in the document), a differential device (referred to as a "differential device (17)" in the document) for transmitting power to the left and right drive wheels, a differential lock device (referred to as a "lock mechanism (78)" in the document) for switching the differential device between a differential state and a non-differential state, and a drive-wheel switchover device (referred to as a "drive switchover device (89)" in the document) for switching the traveling device between a two-wheel drive state and a four-wheel drive state. The differential lock device is configured to be operable by a pedal (referred to as a "diff-lock pedal" in the document). The drive-wheel switchover device is configured to be operable by a lever (referred to as a "switchover lever" in the document).

With the work vehicle disclosed in JP2009-67081 A, it is necessary to mechanically interlock the pedal and the differential lock device via a wire or the like and to mechanically interlock the lever and the drive-wheel switchover device via a wire or the like. Therefore, there remains room for improvement in the respect of simplification of the arrangement of operating the differential lock device and the arrangement of operating the drive-wheel switchover device.

In view of the above-described situation, there is a need for a work vehicle that allows simplification of the arrangement of operating the differential lock device and the arrangement of operating the drive-wheel switchover device.

SUMMARY OF THE INVENTION

A work vehicle comprising:
a traveling device including left and right drive wheels;
a differential device that transmits power to the left and right drive wheels;
a differential lock device switching the differential device between a differential state and a non-differential state;
a drive-wheel switchover device configured to switch the traveling device between a two-wheel drive state and a four-wheel drive state;
a first actuator driving the differential lock device;
a second actuator driving the drive-wheel switchover device;
a first operational tool for operating driving of the first actuator;
a second operational tool for operating driving of the second actuator; and
a control device including:
a first driving section configured to drive the first actuator in response to a manual operation on the first operational tool; and
a second driving section configured to drive the second actuator in response to a manual operation on the second operational tool.

With the above-described inventive arrangement, the first operational tool is electrically connected with the first actuator and the second operational tool is electrically connected with the second actuator. This arrangement eliminates the need for mechanically interlocking the first operational tool with the differential lock device via a wire or the like as well as the need for mechanically interlocking the second operational tool with the drive-wheel switchover device via a wire of the like. Namely, it is possible to realize a work vehicle that allows simplification of the arrangement of operating the differential lock device and the arrangement of operating the drive-wheel switchover device.

According to one embodiment, the first driving section refrains from driving the first actuator by not driving the first actuator despite a manual operation on the first operational tool, if a vehicle speed is higher than a first reference vehicle speed.

Here, in the course of high-speed traveling of the work vehicle, if the differential lock device is driven, a significant load will be applied to the differential lock device. Thus, there is a concern of frictional wear or damage in the members constituting the differential lock device. On the other hand, with the inventive arrangement described above, during high-speed traveling of the work vehicle, if the work vehicle is traveling at a speed higher than a first reference vehicle speed, the differential lock device is not driven, so that frictional wear or damage in the members constituting the differential lock device can be avoided.

According to one embodiment, the first driving section drives the first actuator when the vehicle speed becomes equal to or lower than the first reference vehicle speed after refraining from the driving of the first actuator.

With the above-described inventive arrangement, when the vehicle speed becomes equal to or lower than the first reference vehicle speed, the differential lock device is automatically driven. Thus, this arrangement can eliminate need for the worker to operate the first operational tool again in order to drive the differential lock device after the vehicle speed becomes equal to or lower than the first reference vehicle speed.

According to one embodiment, the second driving section refrains from driving the second actuator by not driving the second actuator despite a manual operation on the second operational tool, if a vehicle speed is higher than a second reference vehicle speed.

Here, in the course of high-speed traveling of the work vehicle, if the drive-wheel switchover device is driven, a significant load will be applied to the drive-wheel switchover device. Thus, there is a concern of frictional wear or damage in the members constituting the drive-wheel switchover device. On the other hand, with the inventive arrangement described above, during high-speed traveling of the work vehicle, if the work vehicle is traveling at a speed higher than a second reference vehicle speed, the drive-wheel switchover device is not driven, so that frictional wear or damage in the members constituting the drive-wheel switchover device can be avoided.

According to one embodiment, the second driving section drives the second actuator when the vehicle speed becomes equal to or lower than the second reference vehicle speed after refraining from the driving of the second actuator.

With the above-described inventive arrangement, when the vehicle speed becomes equal to or lower than the second reference vehicle speed, the drive-wheel switchover device is automatically driven. Thus, this arrangement can eliminate need for the worker to operate the second operational tool again in order to drive the drive-wheel switchover device after the vehicle speed becomes equal to or lower than the second reference vehicle speed.

According to one embodiment;

the first driving section refrains from driving the first actuator by not driving the first actuator despite a manual operation on the first operational tool, if a vehicle speed is higher than a first reference vehicle speed; and the second driving section refrains from driving the second actuator by not driving the second actuator despite a manual operation on the second operational tool, if a vehicle speed is higher than a second reference vehicle speed.

According to one embodiment;

the first driving section drives the first actuator when the vehicle speed becomes equal to or lower than the first reference vehicle speed after refraining from the driving of the first actuator; and the second driving section drives the second actuator when the vehicle speed becomes equal to or lower than the second reference vehicle speed after refraining from the driving of the second actuator.

According to one embodiment, the first reference vehicle speed is equal to the second reference vehicle speed.

With the above-described inventive arrangement, it is possible to realize a simple control arrangement easy for the worker to understand without confusion between the first reference vehicle speed and the second reference vehicle speed.

According to one embodiment, the work vehicle further comprising:

an engine;

a speed changer device provided in a power transmission path from the engine to the traveling device and configured to speed-change power from the engine; and a speed changer operational tool for speed-changing the speed changer device;

wherein:

the speed changer operational tool is configured to be changeable in position to a parking position where the speed changer device is switched to a parking state; and in response to a manual operation of the speed changer tool to the parking position, the first driving section drives the first actuator to cause the differential lock device to switch the differential device to the non-differential state.

With the above-described inventive arrangement, when the speed changer device is switched to the parking state, the differential device is switched over to the non-differential state. With this, the work vehicle can be parked in a stable manner, without needing an operation of switching the differential device to the non-differential state, separately from and in addition to an operation of switching the speed changer device to the parking state.

BRIEF DESCRIPTION OF THE DRAWINGS

FIG. 2 is a diagram showing a control arrangement of the vehicle.

DETAILED DESCRIPTION OF PREFERRED EMBODIMENT

Figure 1:
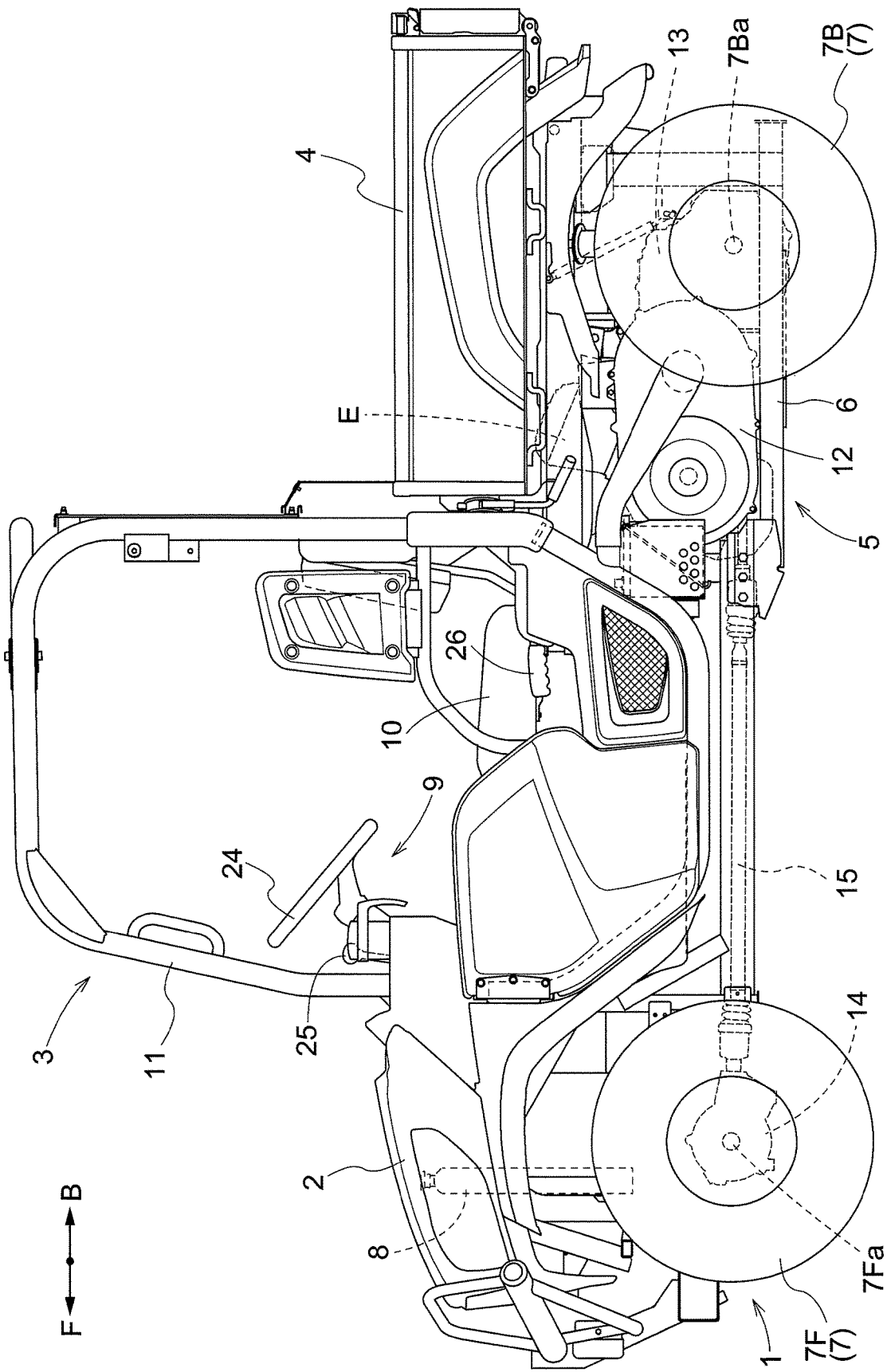
FIG. 1 is a left side view showing a multipurpose vehicle.

A mode of embodying the present invention will be explained with reference to the accompanying drawings. Incidentally, in the following explanation, with reference to FIG. 1, a direction of arrow F is defined as "vehicle body front side", a direction of arrow B is defined as "vehicle body rear side", the direction on the left side facing the direction of arrow F is defined as "vehicle body left side" and the direction on the right side facing the direction of arrow F is defined as "vehicle body right side", respectively.

[General Arrangement of Multipurpose Vehicle]

FIG. 1 shows a utility vehicle (a multipurpose vehicle) corresponding to a "work vehicle" relating to the present invention. This vehicle includes a traveling vehicle body 1, an engine hood 2, a riding section 3 where a passenger (or a driver) is to ride, a dumping type load carrier bed 4, a water-cooled engine E, and a speed changer section 5. The traveling vehicle body 1 includes a vehicle body frame 6 and a traveling device 7.

The traveling device 7 includes steerable and drivable left and right front wheels 7F and non-steerable and drivable rear wheels 7B (corresponding to "drive wheels" relating to this invention). The traveling device 7 is configured to be switchable between a two-wheel drive state in which only the left and right rear wheels 7B are driven and a four-wheel drive state in which the left and right front wheels 7F and the left and right rear wheels 7B are driven.

The engine hood 2 is disposed forwardly of the riding section 3. The engine hood 2 accommodates a radiator 8 for cooling water for cooling the engine E, and so on.

The driving section 3 includes a maneuvering section 9, a seat 10 and a ROPS 11 for passenger (driver) protection. The load carrier bed 4 is disposed rearwardly of the riding section 3. The engine E and the speed changer section 5 are disposed downwardly of the load carrier bed 4. The speed changer section 5 is provided in a power transmission path from the engine E to the traveling device 7. The speed changer section 5 includes a belt type stepless speed changer device 12 for steplessly speed-changing the power from the engine E and a speed changer device 13.

To the speed changer device 13, there are connected left and right rear axles 7Ba to be able to transmit power from the speed changer device 13. The power from the speed changer device 13 is to be transmitted via the left and right rear axles 7Ba to the left and right rear wheels 7B.

There is provided a front differential device 14 for transmitting the power from the speed changer device 13 to the left and right front wheels 7F. Between the speed changer device 13 and the front wheel differential device 14, a transmission shaft 15 is provided for transmitting the power from the speed changer device 13 to the front differential device 14. To the front differential device 14, there are connected left and right front axles 7Fa to be able to transmit power from the front differential device 14. The power from the front differential device 14 is to be transmitted via the left and right front axles 7Fa to the left and right front wheels 7F.

[Speed Changer Section]

As shown in FIG. 2, the speed changer device 13 includes a gear type speed changer mechanism 16 for speed-changing power from the stepless speed changer device 12, a rear differential device 17 (corresponding to the "differential device" relating to the present invention) for transmitting the power from the speed changer mechanism 16 to the left and right rear wheels 7B, a differential lock device 18 for switching the rear differential device 17 between a differential state and a non-differential state, a drive-wheel switchover device 19 for switching the traveling device 7 between the two-wheel drive state and the four-wheel drive state, a parking brake device 20 capable of braking the traveling device 7, a first actuator 21 for driving the differential lock device 18 and a second actuator 22 for driving the drive-wheel switchover device 19.

The speed changer mechanism 16 is configured to be switchable among a forward high-speed state, a forward low-speed state, a reverse speed state, a neutral state and a parking state. The differential lock device 18 is configured to be switchable between a differential lock state for switching the rear differential device 17 to the non-differential state and a differential lock releasing state for switching the rear differential device 17 to the differential state.

By the first actuator 21, the differential lock device 18 is switched over between the differential lock state and the differential lock releasing state. In the instant embodiment, the first actuator 21 comprises a solenoid.

The drive-wheel switchover device 19 is configured to be switchable between a power transmitting state (corresponding to a "four wheel drive state") for transmitting power from an output shaft of the speed changer device 13 to the transmission shaft 15 and a power transmission blocking state (corresponding to a "two wheel drive state") for not transmitting the power from the output shaft of the speed changer device 13 to the transmission shaft 15. The drive-wheel switchover device 19 is configured and arranged between the transmission shaft 15 and the output shaft of the speed changer device 13. In the instant embodiment, the drive-wheel switchover device 19 comprises a meshing type pawl clutch (a dog clutch).

By the second actuator 22, the drive-wheel switchover device 19 is switched over between the power transmitting state and the power transmission blocking state. In the instant embodiment, the second actuator 22 comprises an electromagnetic clutch.

The parking brake device 20 is configured to be switchable between a braking state for braking the traveling device 7 and a non-braking state for not braking the traveling device 7. The parking brake 20 and the differential lock device 18 are mechanically interlocked with each other via an interlocking mechanism 23 so that the differential lock device 18 may be switched over to the differential lock state in operative association with switchover of the parking brake device 20 to the braking state.

[Maneuvering Section]

As shown in FIG. 1 and FIG. 2, the maneuvering section 9 includes a steering wheel 24 for maneuvering the left and right front wheels 7F, a speed changer lever 25 (corresponding to a "speed changer operational tool" relating to the present invention), a parking brake lever 26, a differential lock switch 27 (corresponding to a "first operational tool" relating to the present invention) and a drive-wheel switchover switch 28 (corresponding to a "second operational tool" relating to the present invention).

The speed changer lever 25 is used for speed-changing the speed changer mechanism 16. In order to allow the speed changer lever 25 to speed-change the speed changer mechanism 16, the speed changer lever 25 and the speed changer mechanism 16 are mechanically interlocked with each other via an interlocking mechanism 29. The speed changer lever 25 is configured to be changeable in position among a forward high-speed position for switching the speed changer mechanism 16 to the forward high-speed state, a forward low-speed position for switching the speed changer mechanism 16 to the forward low-speed state, a reverse position for switching the speed changer mechanism 16 to the reverse state, a neutral position for switching the speed changer mechanism 16 to the neutral state and a parking position for switching the speed changer mechanism 16 to the parking state.

The parking brake lever 26 is used for switching the parking brake device 20 between the braking state and the non-braking state. In order to allow the parking brake lever 26 to switch the parking brake device 20 between the braking state and the non-braking state, the parking brake lever 26 and the parking brake device 20 are mechanically interlocked with each other via an interlocking mechanism 30.

The differential lock switch 27 is used for switching the rear differential device 17 between the differential state and the non-differential state. More particularly, the differential lock switch 27 is used for driving the first actuator 21 so as to switch the differential lock device 18 between the differential lock state and the differential lock releasing state. The differential lock switch 27 may comprises e.g. a locker type switch or a dial type switch.

The drive-wheel switchover switch 28 is used for switching the traveling device 7 between the two-wheel drive state and the four-wheel drive state. More particularly, the drive-wheel switchover switch 28 is used for driving the second actuator 22 so as to switch the drive-wheel switchover device 19 between the power transmitting state and the power transmission blocking state. The drive-wheel switchover switch 28 may comprises e.g. a locker type switch or a dial type switch.

[Control Arrangement]

FIG. 2 shows a control arrangement of the inventive vehicle. The control arrangement of the inventive vehicle includes, in addition to the speed changer lever 25, the parking brake lever 26, the differential lock switch 27 and the drive-wheel switchover switch 28, a main vehicle ECU 31 (corresponding to a "control device" relating to the present invention), an engine ECU 32, a parking position detection switch 33, a neutral state detection switch 34, a gear position detection switch 35 and a vehicle speed sensor 36.

The parking position detection switch 33 is used for detecting the speed changer lever 25 being located at the parking position. The neutral state detection switch 34 is used for detecting the speed changer mechanism 16 being located under the neutral state. The gear position detection switch 35 is used for detecting a gear position of the speed changer mechanism 16. The vehicle speed sensor 36 is used for determining a vehicle speed (e.g. a rotational speed of the output shaft of the speed changer device 13) of the vehicle.

The main vehicle ECU 31 includes a first driving section 37, a second driving section 38 and a storage section 39. The storage section 39 stores therein not only a program for implementing the first driving section 37 and the second driving section 38, but also e.g. a reference vehicle speed Sr (corresponding to a "first reference vehicle speed", a "second reference vehicle speed" relating to the present invention) to be described later and so on. The main vehicle ECU 31 and the engine ECU 32 are connected to each other via CAN (Controller Area Network) communication to be capable of communication therebetween.

The differential lock switch 27, the drive-wheel switchover switch 28 and the parking position detection switch 33 respectively are electrically connected to the main vehicle ECU 31 so that respective electric signals thereof may be inputted to the main vehicle ECU 31. The neutral state detection switch 34, the gear position detection switch 35 and the vehicle speed sensor 36 respectively are electrically connected to the engine ECU 32 so that respective electric signals thereof may be inputted to the engine ECU 32. Incidentally, the solid line arrows in FIG. 2 represent flows of the electric signals.

[First Driving Section]

The first driving section 37 is configured to drive the first actuator 21 in response to a manual operation on the differential lock switch 27.

More particularly, the first driving section 37, when the rear differential device 17 is operated into the differential state by the differential lock switch 27, drives the first actuator 21 so that the differential lock device 18 may be switched to the differential lock releasing state.

Further, the first driving section 37, when the rear differential device 17 is operated into the non-differential state by the differential lock switch 27, drives the first actuator 21 so that the differential lock device 18 may be switched to the differential lock state.

In the above, when a vehicle speed determined by the vehicle speed sensor 36 is higher than a reference vehicle speed Sr, the first driving section 37 does not drive the first actuator 21, but refrains from driving the first actuator 21, despite a manual operation on the differential lock switch 27.

More particularly, when the vehicle speed determined by the vehicle speed sensor 36 is higher than the reference vehicle speed Sr, the first driving section 37 does not drive the first actuator 21, but refrains from driving the first actuator 21, even if the operation of switching the rear differential device 17 to the differential state is effected by the differential lock switch 27.

Moreover, when the vehicle speed determined by the vehicle speed sensor 36 is higher than the reference vehicle speed Sr, the first driving section 37 does not drive the first actuator 21, but refrains from driving the first actuator 21, even if the operation of switching the rear differential device 17 to the non-differential state is effected by the differential lock switch 27.

And, after refraining from the driving of the first actuator 21, when the vehicle speed determined by the vehicle speed sensor 26 becomes equal to or lower than the reference vehicle speed Sr, the first driving section 37 drives the first actuator 21.

More particularly, in case the operation of switching the rear differential device 17 to the differential state is effected by the differential lock switch 27, if the first driving section 37 has refrained from driving the first actuator 21, after this refraining from driving the first actuator 21, the first driving section 37 will automatically (even if the operation of switching the rear differential device 17 to the differential state by the differential lock switch 27 is not effected) drive the first actuator 21 to switch the differential lock device 18 to the differential lock releasing state, when the vehicle speed determined by the vehicle speed sensor 36 becomes equal to or lower than the reference vehicle speed Sr.

Also, in case the operation of switching the rear differential device 17 to the non-differential state is effected by the differential lock switch 27, if the first driving section 37 has refrained from driving the first actuator 21, after refraining from driving the first actuator 21, the first driving section 37 will automatically (even if the operation of switching the rear differential device 17 to the non-differential state by the differential lock switch 27 is not effected) drive the first actuator 21 to switch the differential lock device 18 to the differential lock state, when the vehicle speed determined by the vehicle speed sensor 36 becomes equal to or lower than the reference vehicle speed Sr.

In the above, the first driving section 37 drives the first actuator 21 to cause the differential lock device 18 to switch the rear differential device 17 to the non-differential state, in response to a manual operation of the speed changer lever 25 to the parking position.

Namely, the first driving section 37 drives the first actuator 21 to switch the differential lock device 18 to the differential lock state, upon detection of the speed changer lever 25 being located at the parking position by the parking position detection switch 33.

[Second Driving Section]

The second driving section 38 is configured to drive the second actuator 22 in response to a manual operation on the drive-wheel switchover switch 28.

More particularly, the second driving section 38, when the traveling device 7 is operated into the two-wheel drive state by the drive-wheel switchover switch 28, drives the second actuator 22 so that the drive-wheel switchover device 19 may be switched to the power transmission blocking state.

Further, when the operation of switching the traveling device 7 to the four-wheel drive state is effected by the drive-wheel switchover switch 28, the second driving section 38 drives the second actuator 22 so that the drive-wheel switchover device 19 may be switched to the power transmitting state.

In the above, if the vehicle speed determined by the vehicle speed sensor 36 is higher than the reference vehicle speed Sr, the second driving section 38 does not drive the second actuator 22, but refrains from driving the second actuator 22, despite a manual operation on the drive-wheel switchover switch 28.

More particularly, if the vehicle speed determined by the vehicle speed sensor 36 is higher than the reference vehicle speed Sr, the second driving section 38 does not drive the second actuator 22, but refrains from driving the second actuator 22, even if the operation switching the traveling device 7 to the two-wheel drive state is effected by the drive-wheel switchover switch 28.

Further, in case the vehicle speed determined by the vehicle speed sensor 36 is higher than the reference vehicle speed Sr, the second driving section 38 does not drive the second actuator 22, but refrains from driving the second actuator 22, even if the operation of switching the traveling device 7 to the four-wheel drive state is effected by the drive-wheel switchover switch 28.

Then, after refraining from driving the second actuator 22, the second driving section 38 will drive the second actuator 22 when a vehicle speed determined by the vehicle speed sensor 36 becomes equal to or lower than the reference vehicle speed Sr.

More particularly, in case the operation of switching the traveling device 7 to the two-wheel drive state is effected by the drive-wheel switchover switch 28, if the second driving section 38 has refrained from driving the second actuator 22, after this refraining from driving the second actuator 22, the second driving section 38 will automatically (even if the operation of switching the traveling device 7 to the two-wheel drive state by the drive-wheel switchover switch 28 is not effected) drive the second actuator 22 to switch the drive-wheel switchover device 19 to the power transmission blocking state, when the vehicle speed determined by the vehicle speed sensor 36 becomes equal to or lower than the reference vehicle speed Sr.

Also, in case the operation of switching the traveling device 7 to the four-wheel drive state is effected by the drive-wheel switchover switch 28, if the second driving section 38 has refrained from driving the second actuator 22, after refraining from driving the second actuator 22, the second driving section 38 will automatically (even if the operation of switching the traveling device 7 to the four-wheel drive state by the drive-wheel switchover switch 28 is not effected) drive the second actuator 22 to switch the drive-wheel switchover device 19 to the power transmitting state, when the vehicle speed determined by the vehicle speed sensor 36 becomes equal to or lower than the reference vehicle speed Sr.

Other Embodiments (1) In the foregoing embodiment, in case the vehicle speed is higher than the reference vehicle speed Sr, the first driving section 37 does not drive the first actuator 21, but refrains from driving the first actuator 21, despite a manual operation on the differential lock switch 27.

Alternatively, however, even in case the vehicle speed is higher than the reference vehicle speed Sr, the first driving section 37 may drive the first actuator 21, not refraining from driving the first actuator 21, in response to a manual operation on the differential lock switch 27.

(2) In the foregoing embodiment, in case the vehicle speed is higher than the reference vehicle speed Sr, the second driving section 38 does not drive the second actuator 22, but refrains from driving the second actuator 22, despite a manual operation on the drive-wheel switchover switch 28. Alternatively, however, even in case the vehicle speed is higher than the reference vehicle speed Sr, the second driving section 38 may drive the second actuator 22, not refraining from driving the second actuator 22, in response to a manual operation on the drive-wheel switchover switch 28.

(3) In the foregoing embodiment, the "drive wheels" relating to the present invention comprise the rear wheels 7B and also the "differential device" relating to the present invention comprises the rear differential device 17. Alternatively, however, the "drive wheels" relating to the present invention may comprise the front wheels 7F and also the "differential device" relating to the present invention may comprise the front differential device 14.

(4) In the foregoing embodiment, the first actuator 21 comprises a solenoid. Alternatively, however, the first actuator 21 may comprise an actuator other than a solenoid.

(5) In the foregoing embodiment, the second actuator 22 comprises an electromagnetic clutch. Alternatively, however, the second actuator 22 may comprise a clutch other than an electromagnetic clutch.

(6) In the foregoing embodiment, the differential lock switch 27 and the drive-wheel switchover switch 28 are provided as separate switches. Alternatively, however, the "first operational tool" relating to the present invention and the "second operational tool" relating to the present invention may comprise a single operational tool.

(7) In the foregoing embodiment, the "first reference vehicle speed" relating to the present invention is same as the "second reference vehicle speed" relating to the present invention (both being "reference vehicle speed Sr"). Alternatively, however, the "first reference vehicle speed" relating to the present invention may be different from the "second reference vehicle speed" relating to the present invention.

(8) The present invention is applicable not only to a multipurpose vehicle, but also to an agricultural work vehicle, such as a tractor, a combine, a rice planting machine, etc. as well as to a civil engineering work vehicle.

The invention claimed is:

1. A work vehicle comprising:
   a traveling device including left and right drive wheels;
   a differential device that transmits power to the left and right drive wheels;
   a differential lock device switching the differential device between a differential state and a non-differential state;
   a drive-wheel switchover device configured to switch the traveling device between a two-wheel drive state and a four-wheel drive state;
   a first actuator driving the differential lock device;
   a second actuator driving the drive-wheel switchover device;
   a first operational tool for operating driving of the first actuator;
   a second operational tool for operating driving of the second actuator; and
   a control device including:
      a first driving section configured to drive the first actuator in response to a manual operation on the first operational tool; and
      a second driving section configured to drive the second actuator in response to a manual operation on the second operational tool.

2. The work vehicle of claim 1, wherein the first driving section refrains from driving the first actuator by not driving the first actuator despite a manual operation on the first operational tool, if a vehicle speed is higher than a first reference vehicle speed.

3. The work vehicle of claim 2, wherein the first driving section drives the first actuator when the vehicle speed becomes equal to or lower than the first reference vehicle speed after refraining from the driving of the first actuator.

4. The work vehicle of claim 1, wherein the second driving section refrains from driving the second actuator by not driving the second actuator despite a manual operation on the second operational tool, if a vehicle speed is higher than a second reference vehicle speed.

5. The work vehicle of claim 4, wherein the second driving section drives the second actuator when the vehicle speed becomes equal to or lower than the second reference vehicle speed after refraining from the driving of the second actuator.

6. The work vehicle of claim 1, wherein:
   the first driving section refrains from driving the first actuator by not driving the first actuator despite a manual operation on the first operational tool, if a vehicle speed is higher than a first reference vehicle speed; and
   the second driving section refrains from driving the second actuator by not driving the second actuator despite a manual operation on the second operational tool, if a vehicle speed is higher than a second reference vehicle speed.

7. The work vehicle of claim 6, wherein:
   the first driving section drives the first actuator when the vehicle speed becomes equal to or lower than the first reference vehicle speed after refraining from the driving of the first actuator; and the second driving section drives the second actuator when the vehicle speed becomes equal to or lower than the second reference vehicle speed after refraining from the driving of the second actuator.

8. The work vehicle of claim 6, wherein the first reference vehicle speed is equal to the second reference vehicle speed.

9. The work vehicle of claim 1, further comprising:

an engine;

a speed changer device provided in a power transmission path from the engine to the traveling device and configured to speed-change power from the engine; and a speed changer operational tool for speed-changing the speed changer device;

wherein:

the speed changer operational tool is configured to be changeable in position to a parking position where the speed changer device is switched to a parking state; and in response to a manual operation of the speed changer tool to the parking position, the first driving section drives the first actuator to cause the differential lock device to switch the differential device to the non-differential state.

\* \* \* \* \*